(12) United States Patent
Palese et al.

(10) Patent No.: US 11,894,873 B2
(45) Date of Patent: Feb. 6, 2024

(54) PHOTONIC INTEGRATED CIRCUIT WITH INVERTED H-TREE UNIT CELL DESIGN

(71) Applicant: Raytheon Company, Waltham, MA (US)

(72) Inventors: Stephen P. Palese, Redondo Beach, CA (US); Richard L. Kendrick, San Mateo, CA (US); Moe D. Soltani, Belmont, MA (US)

(73) Assignee: Raytheon Company, Tewksbury, MA (US)

( * ) Notice: Subject to any disclaimer, the term of this patent is extended or adjusted under 35 U.S.C. 154(b) by 36 days.

(21) Appl. No.: 17/809,608

(22) Filed: Jun. 29, 2022

(65) Prior Publication Data
US 2024/0007185 A1 Jan. 4, 2024

(51) Int. Cl.
*H04B 10/11* (2013.01)
*H04B 10/43* (2013.01)

(52) U.S. Cl.
CPC ............. *H04B 10/11* (2013.01); *H04B 10/43* (2013.01)

(58) Field of Classification Search
CPC .................. H04B 10/11; H04B 10/43
See application file for complete search history.

(56) References Cited

U.S. PATENT DOCUMENTS

| | | | |
|---|---|---|---|
| 3,975,628 A | 8/1976 | Graves et al. | |
| 5,321,849 A * | 6/1994 | Lemson | H03G 3/3084 455/249.1 |
| 6,081,232 A * | 6/2000 | Pittman | H01Q 3/46 342/368 |
| 6,337,660 B1 * | 1/2002 | Esman | H01Q 3/2676 342/375 |
| 7,408,507 B1 | 8/2008 | Paek et al. | |
| 7,729,572 B1 | 6/2010 | Pepper et al. | |
| 7,949,030 B2 | 5/2011 | Volodin | |
| 8,068,235 B1 | 11/2011 | Marron et al. | |
| 9,705,561 B2 * | 7/2017 | Henry | H04B 7/04 |
| 10,090,594 B2 * | 10/2018 | Henry | H01Q 13/106 |

(Continued)

FOREIGN PATENT DOCUMENTS

EP 3761528 A1 1/2021

OTHER PUBLICATIONS

Palese et al., "Photonic Integrated Circuit With Independent Unit Cells Having Multi-Polarization Sensitivity", U.S. Appl. No. 17/654,200, filed Mar. 9, 2022, 38 pages.

(Continued)

*Primary Examiner* — Mina M Shalaby

(57) ABSTRACT

An apparatus includes a photonic integrated circuit having an optical phased array, where the optical phased array includes multiple unit cells. Each unit cell includes multiple antenna elements configured to transmit or receive optical signals, where a first subset of the antenna elements is oriented in a first direction and a second subset of the antenna elements is oriented in a second direction opposite the first direction. Each unit cell also includes multiple signal pathways configured to transport the optical signals to or from the antenna elements, where at least some of the signal pathways have an "H" configuration. Each unit cell further includes multiple phase modulators configured to modify phases of the optical signals being transported through the signal pathways.

20 Claims, 11 Drawing Sheets

(56) References Cited

U.S. PATENT DOCUMENTS

| | | | | |
|---|---|---|---|---|
| 10,148,016 | B2* | 12/2018 | Johnson | H01Q 21/067 |
| 10,224,634 | B2* | 3/2019 | Henry | H01Q 19/108 |
| 10,340,601 | B2* | 7/2019 | Henry | H01Q 13/24 |
| 10,340,603 | B2* | 7/2019 | Henry | H01Q 21/22 |
| 10,374,316 | B2* | 8/2019 | Bennett | H01Q 19/08 |
| 10,498,044 | B2* | 12/2019 | Henry | H01Q 1/46 |
| 10,535,928 | B2* | 1/2020 | Henry | H01Q 15/08 |
| 10,694,379 | B2* | 6/2020 | Liu | H04W 12/06 |
| 10,790,909 | B1 | 9/2020 | Suni | |
| 10,804,616 | B2* | 10/2020 | Buer | H01Q 21/0006 |
| 10,838,222 | B2 | 11/2020 | Khachaturian et al. | |
| 11,029,465 | B1 | 6/2021 | Rakowski et al. | |
| 11,476,576 | B2 | 10/2022 | Palese et al. | |
| 11,532,881 | B2 | 12/2022 | Kendrick et al. | |
| 11,768,418 | B2* | 9/2023 | Watts | G02B 6/29331 385/3 |
| 2006/0239312 | A1 | 10/2006 | Kewitsch et al. | |
| 2015/0293224 | A1 | 10/2015 | Eldada et al. | |
| 2016/0094016 | A1 | 3/2016 | Beach et al. | |
| 2017/0234984 | A1 | 8/2017 | Khial et al. | |
| 2017/0324162 | A1 | 11/2017 | Khachaturian et al. | |
| 2018/0039154 | A1 | 2/2018 | Hashemi et al. | |
| 2018/0107091 | A1 | 4/2018 | Hosseini et al. | |
| 2019/0267716 | A1* | 8/2019 | Yoon | H01Q 13/0233 |
| 2019/0267722 | A1* | 8/2019 | Yoon | H01Q 21/22 |
| 2020/0192179 | A1 | 6/2020 | Hajimiri | |
| 2020/0284910 | A1 | 9/2020 | Yaacobi et al. | |
| 2021/0063842 | A1* | 3/2021 | Byun | G01S 7/4811 |
| 2021/0067251 | A1 | 3/2021 | Park et al. | |
| 2021/0149227 | A1 | 5/2021 | Lee et al. | |
| 2022/0019019 | A1 | 1/2022 | Kendrick et al. | |
| 2022/0224413 | A1 | 7/2022 | Shamee | |
| 2022/0229343 | A1 | 7/2022 | Kendrick et al. | |
| 2022/0244578 | A1 | 8/2022 | Palese et al. | |
| 2022/0252786 | A1 | 8/2022 | Yengst et al. | |
| 2022/0252908 | A1 | 8/2022 | Inamdar et al. | |
| 2023/0258861 | A1* | 8/2023 | Vercruysse | G02B 6/12016 385/31 |

OTHER PUBLICATIONS

Palese et al., "Photonic Integrated Circuit-Based Polarization-Independent Optical Devices", U.S. Appl. No. 17/659,789, filed Apr. 19, 2022, 38 pages.
Palese, "Photonic Integrated Circuit-Based Optical Communication Optimized for Receive Aperture Amplitude and Phase Modulations", U.S. Appl. No. 17/734,887, filed May 2, 2022, 40 pages.
Palese et al., "Photonic Integrated Circuit Multi-Wavelength Phase Modulator Networks", U.S. Appl. No. 17/809,873, filed Jun. 14, 2022, 45 pages.
Palese, "Photonic Integrated Circuit Temporal and Frequency Dispersion Squint Correction for Optical Phased Array", U.S. Appl. No. 17/809,073, filed Jun. 27, 2022, 44 pages.
Palese, "Photonic Integrated Circuit-Based Transmissive/Reflective Wavefront Optical Phase Control", U.S. Appl. No. 17/662,797, filed May 10, 2022, 35 pages.
Kendrick et al., "Photonic Integrated Circuit-Based Imaging Systems", U.S. Appl. No. 17/654,204, filed Mar. 9, 2022, 27 pages.
Creedon et al., "High efficiency coherent beam combining of semiconductor optical amplifiers," Optics Letters, vol. 37, No. 23, Dec. 2012, 3 pages.
Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.
Heidel et al., "A Review of Electronic-Photonic Heterogeneous Integration at DARPA," IEEE Journal of Selected Topics in Quantum Electronics, vol. 22, No. 6, Nov. 2016, 9 pages.
Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.
Komljenovic et al., "On-chip calibration and control of optical phased arrays," Optics Express, vol. 26, No. 3, Jan. 2018, 12 pages.
Larocque et al., "Beam steering with ultracompact and low-power silicon resonator phase shifters," Optics Express, vol. 27, No. 24, Nov. 2019, 16 pages.
Li et al., "Fast Optical Phased Array Calibration Technique for Random Phase Modulation LiDAR," IEEE Photonics Journal, vol. 11, No. 1, Feb. 2019, 10 pages.
Marron et al., "Atmospheric turbulence correction using digital holographic detection: experimental results," Optics Express, vol. 17, No. 14, Jul. 2009, 14 pages.
Marron et al., "Extended-range digital holographic imaging," Proc. of SPIE, vol. 7684, 2010, 6 pages.
Mehta et al., "An Optically Sampled ADC in 3D Integrated Silicon-Photonics/65nm CMOS," IEEE 2020 Symposium on VLSI Technology Digest of Technical Papers, 2020, 2 pages.
Orcutt et al., "Open foundry platform for high-performance electronic-photonic integration," Optics Express, vol. 20, No. 11, May 2012, 11 pages.
Sayyah et al., "Two-dimensional pseudo-random optical phased array based on tandem optical injection locking of vertical cavity surface emitting lasers," Optics Express, vol. 23, No. 15, Jul. 2015, 12 pages.
Zhang et al., "Phase Calibration of On-Chip Optical Phased Arrays via Interference Technique," IEEE Photonics Journal, vol. 12, No. 2, Apr. 2020, 11 pages.
He et al., "Review of Photonic Integrated Optical Phased Arrays for Space Optical Communication", Oct. 2020, 16 pages.
Blumenthal et al., "Silicon Nitride in Silicon Photonics", Proceeding of the IEEE, vol. 106, No. 12, Dec. 2018, 23 pages.
Abediasl et al., "Monolithic optical phased-array transceiver in a standard SOI CMOS process", Optics Express, vol. 23, No. 5, Mar. 2015, 11 pages.
International Search Report and Written Opinion of the International Searching Authority dated Feb. 24, 2022 in connection with International Patent Application No. PCT/US2021/059421, 16 pages.
International Search Report and Written Opinion of the International Searching Authority dated Apr. 8, 2022 in connection with International Patent Application No. PCT/US2021/064527, 10 pages.
Gomez-Torrent et al., "A 38 dBi Gain, Low-Loss, Flat Array Antenna for 320 GHz to 400 GHz Enabled by Silicon-On-Insulator Micromachining", IEEE Transaction on Antennas and Propagation, vol. 68, Issue 6, Feb. 2020, 10 pages.
Singh, "On the Design of 2×2 MIMO Fractal Antenna Array for C band applications", International Journal of Innovative Technology and Exploring Engineering (IJITEE), vol. 8, Issue 10, Aug. 2019, 5 pages.

* cited by examiner

PHOTONIC INTEGRATED CIRCUIT WITH INVERTED H-TREE UNIT CELL DESIGN

TECHNICAL FIELD

This disclosure relates generally to optical systems. More specifically, this disclosure relates to a photonic integrated circuit with an inverted H-tree unit cell design.

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICO, A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to a photonic integrated circuit with an inverted H-tree unit cell design.

In a first embodiment, an apparatus includes a photonic integrated circuit having an optical phased array, where the optical phased array includes multiple unit cells. Each unit cell includes multiple antenna elements configured to transmit or receive optical signals, where a first subset of the antenna elements is oriented in a first direction and a second subset of the antenna elements is oriented in a second direction opposite the first direction. Each unit cell also includes multiple signal pathways configured to transport the optical signals to or from the antenna elements, where at least some of the signal pathways have an "H" configuration. Each unit cell further includes multiple phase modulators configured to modify phases of the optical signals being transported through the signal pathways.

In a second embodiment, a method includes transmitting or receiving optical signals using a photonic integrated circuit having an optical phased array, where the optical phased array includes multiple unit cells. Each unit cell includes (i) multiple antenna elements that transmit or receive the optical signals, (ii) multiple signal pathways that transport the optical signals to or from the antenna elements, and (iii) multiple phase modulators that modify phases of the optical signals being transported through the signal pathways. In each unit cell, a first subset of the antenna elements is oriented in a first direction and a second subset of the antenna elements is oriented in a second direction opposite the first direction. Also, in each unit cell, at least some of the signal pathways have an "H" configuration.

In a third embodiment, an apparatus includes a photonic integrated circuit having an optical phased array, where the optical phased array includes multiple unit cells. Each unit cell includes multiple antenna elements configured to transmit or receive optical signals, where a first subset of the antenna elements is oriented in a first direction and a second subset of the antenna elements is oriented in a second direction opposite the first direction. Each unit cell also includes multiple signal pathways configured to transport the optical signals to or from the antenna elements, where at least some of the signal pathways have an "H"configuration. Each unit cell further includes multiple phase modulators configured to modify phases of the optical signals being transported through the signal pathways. In addition, each unit cell includes a grating associated with each antenna element, where the grating is positioned above or below at least an emitting/receiving surface and one or more reflectors of the associated antenna element. In each unit cell, the antenna elements include pairs of antenna elements, and the antenna elements of each pair are optically coupled to a common one of the signal pathways. Also, in each unit cell, path lengths to or from the antenna elements defined by the signal pathways are substantially equal to one another.

Other technical features may be readily apparent to one skilled in the art from the following figures, descriptions, and claims.

BRIEF DESCRIPTION OF THE DRAWINGS a more complete understanding of this disclosure, reference is now made to the following description, taken in conjunction with the accompanying drawings, in which.

Figure 7A:
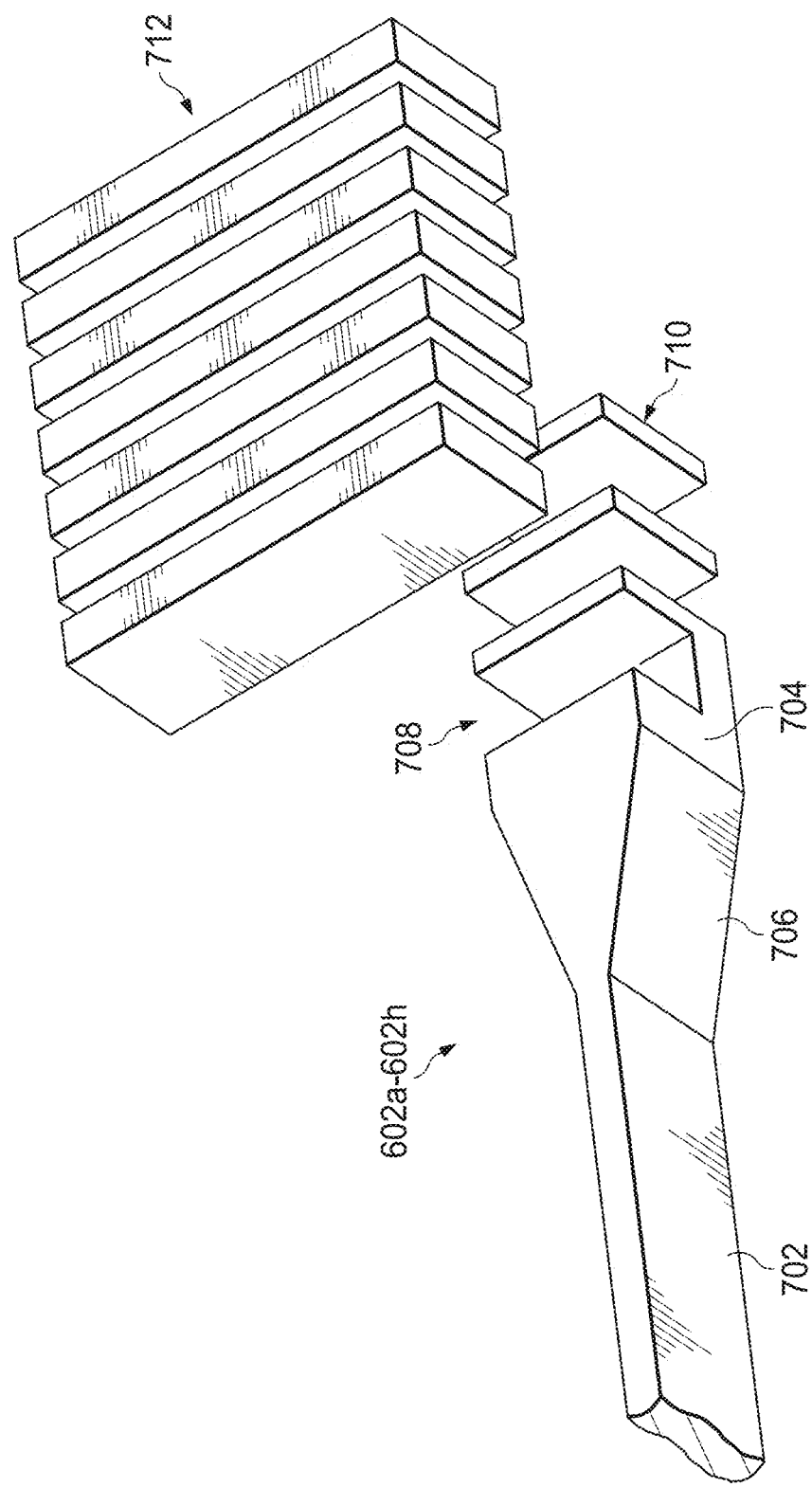
Figure 7B:
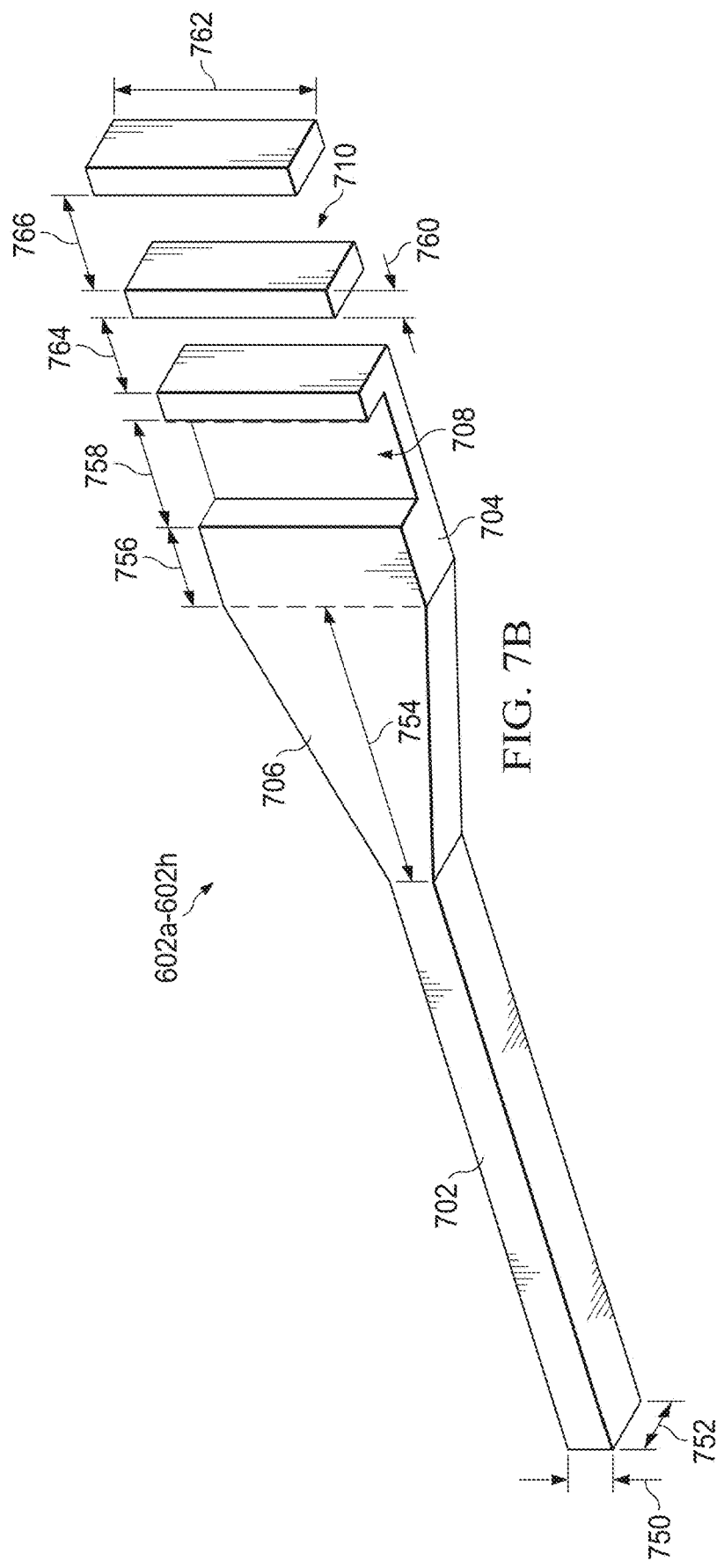
Figure 8:
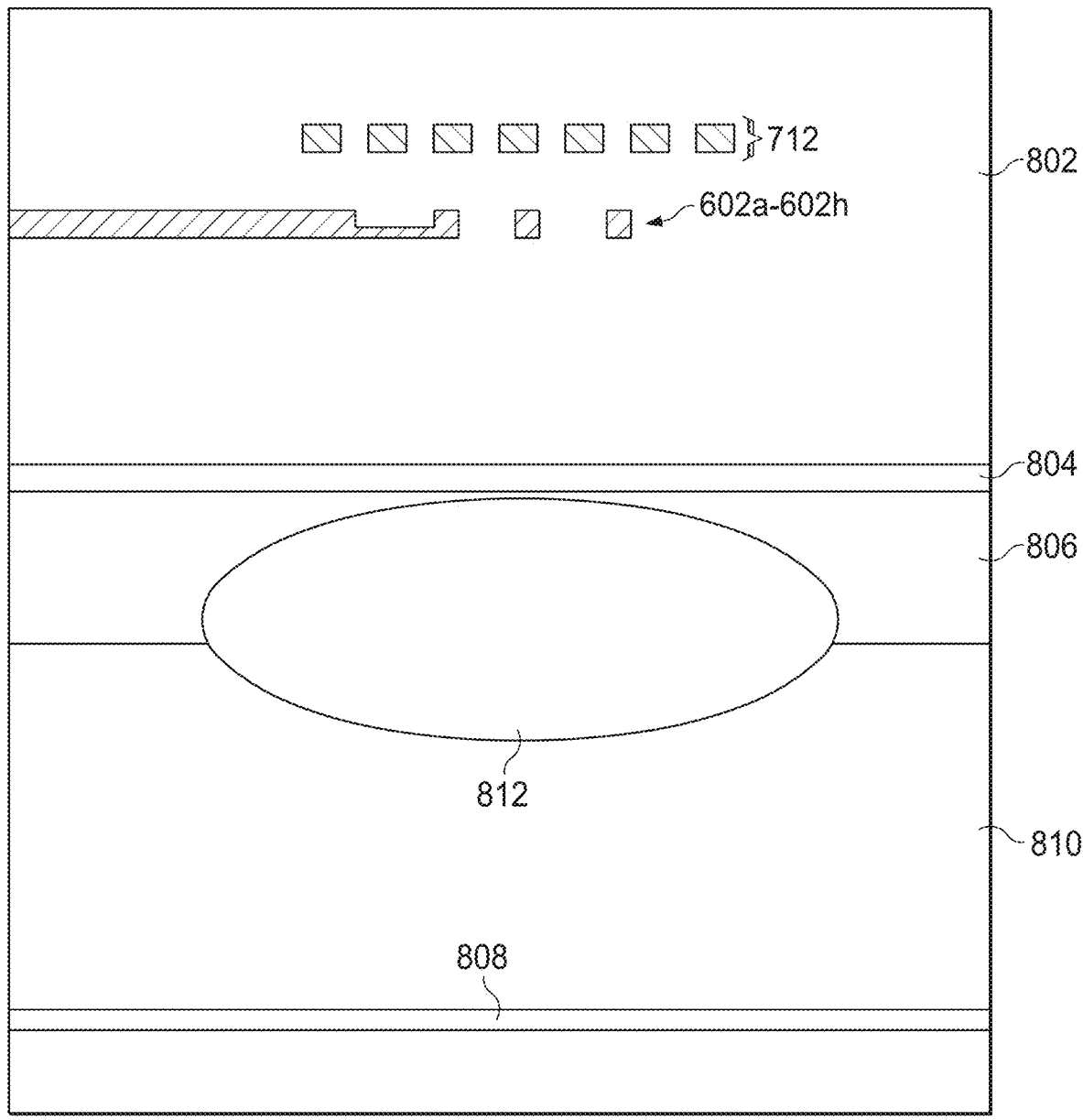
Figure 9:
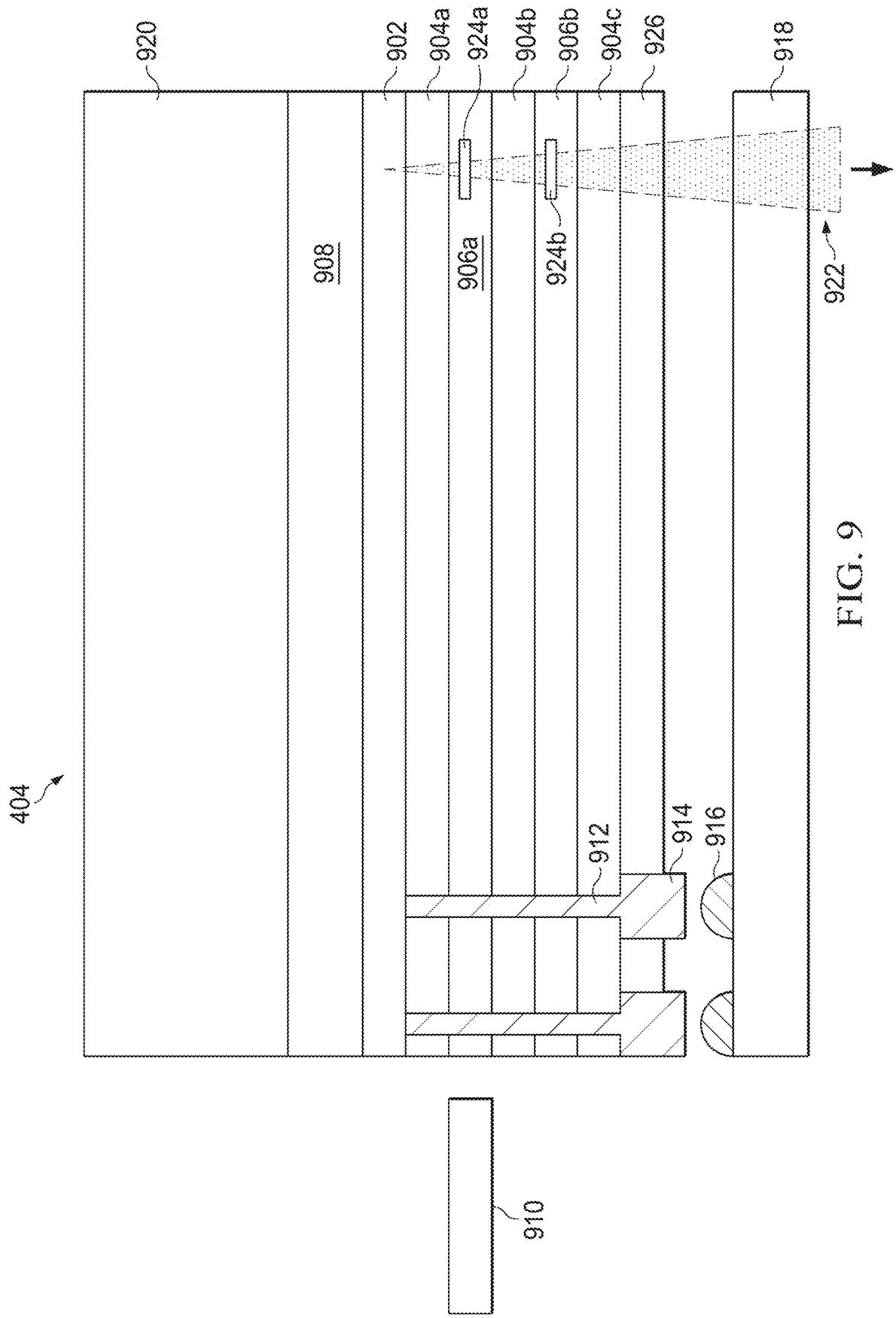
Figure 10:
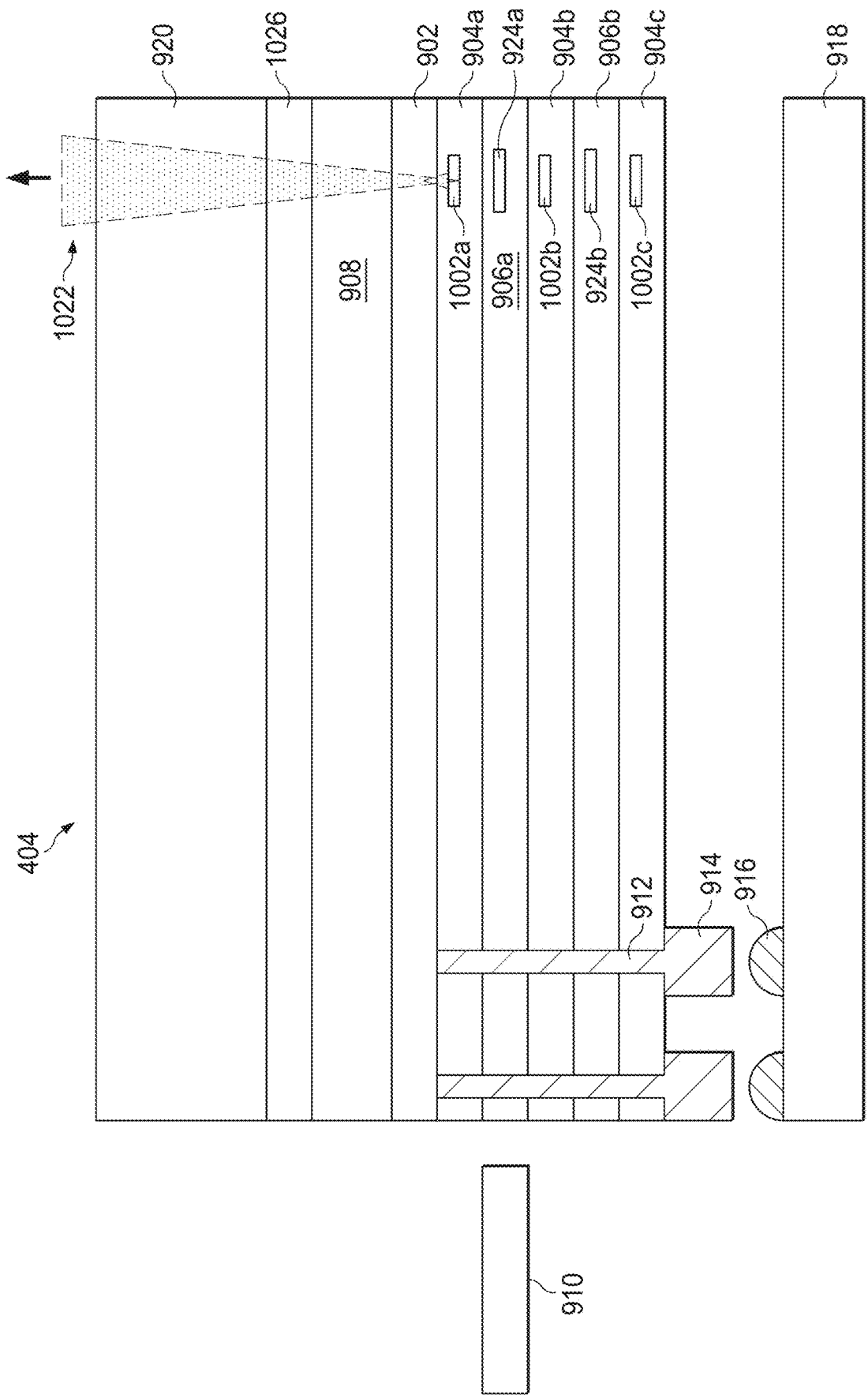
Figure 11:
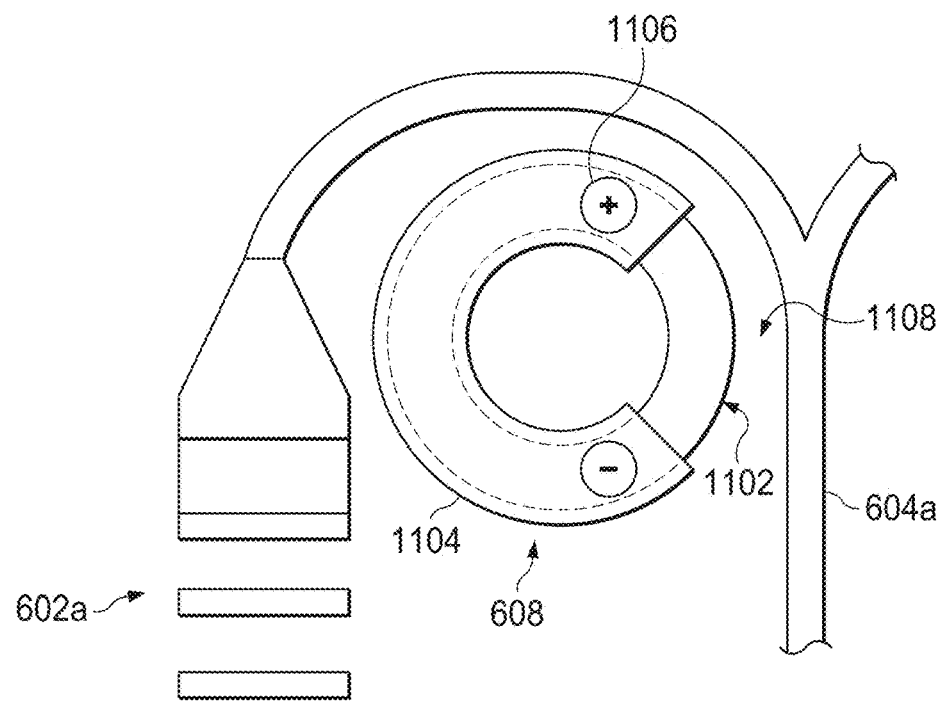
Figure 12:
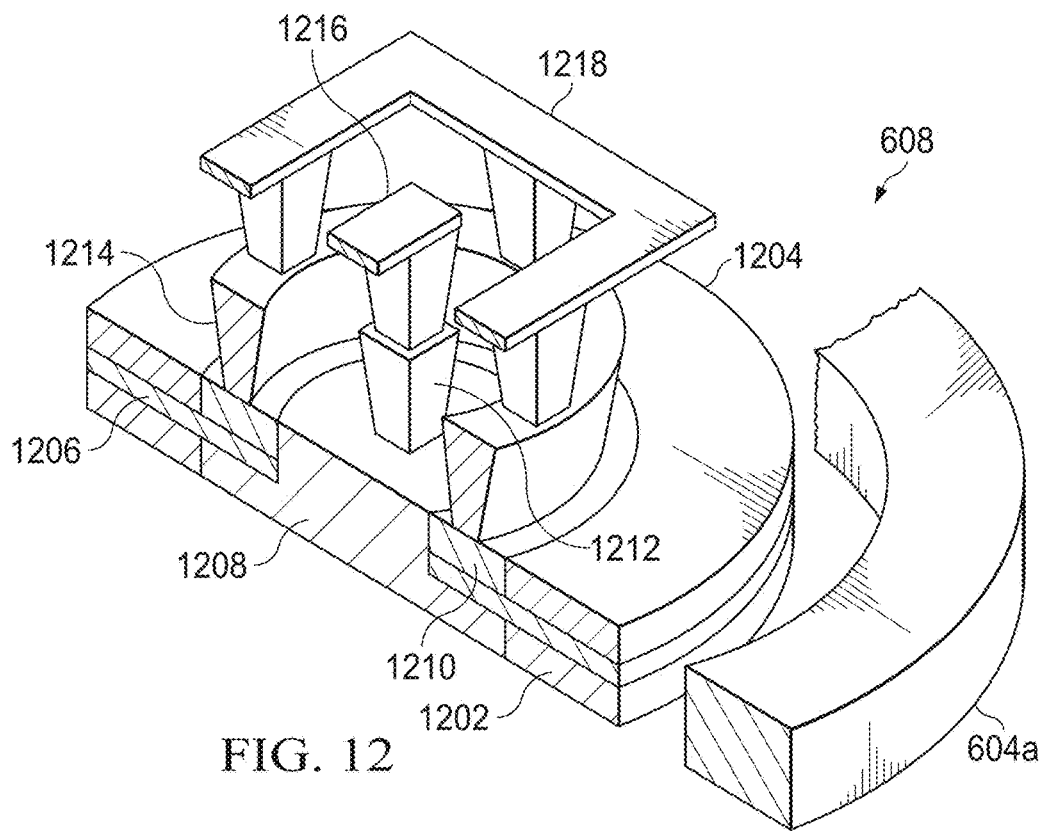

FIGS. 7A, 7B, and 8 illustrate an example antenna element in a photonic integrated circuit having an inverted H-tree unit cell design according to this disclosure;

FIGS. 9 and 10 illustrate example cross-sections of portions of unit cells in a photonic integrated circuit having an inverted H-tree unit cell design according to this disclosure; and FIGS. 11 and 12 illustrate example phase modulators for use in a photonic integrated circuit having an inverted H-tree unit cell design according to this disclosure.

DETAILED DESCRIPTION

FIGS. 1 through 12, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

Different arrangements of nano-antennas have been used in optical devices. For example, a "Manhattan" style arrangement places nano-antennas in a grid pattern having rows and columns of nano-antennas. This arrangement tends to be the most compact and therefore provides a higher fill factor, which typically enables longer ranges and larger fields of regard. This arrangement also allows the nano-antennas to all point in a single direction, which typically means that far-field emissions from the nano-antennas inherently overlap. However, the nano-antennas in each row or column are typically coupled to or otherwise associated with a common signal line. As a result, the path lengths to the nano-antennas in a single row or column can be different, and different path lengths can limit the useable optical bandwidths and data rates that are achievable.

As another example, a "Euler H-tree" style arrangement uses multiple groups of nano-antennas, where each group includes four pairs of nano-antennas that are coupled to or otherwise associated with waveguides that branch at 90° and 180°. This causes the waveguides for each group to appear to have an "H" shape or arrangement. This design allows the nano-antennas in each group to have equal path lengths, which can typically increase or maximize the useable optical bandwidths and data rates that are achievable. However, this design provides a lower fill factor, which typically reduces the range and field of regard. Also, this design may require far-field emissions from the nano-antennas to be symmetric with respect to 90° or 180° rotations in order to achieve suitable overlap of the antenna emissions.

This disclosure provides a photonic integrated circuit with an inverted H-tree unit cell design. As described in more detail below, the photonic integrated circuit implements an optical phased array having multiple unit cells. Each unit cell can include four collections of antenna elements (such as four pairs of antenna elements) that are arranged in an inverted H-tree arrangement. In the inverted H-tree arrangement, two collections of antenna elements face a common direction, and two other collections of antenna elements face the opposite direction. In some cases, the four collections of antenna elements are coupled to or otherwise associated with waveguides that branch at 90° and 180°, causing the waveguides to appear as having an "H" shape.

This design allows the antenna elements in each unit cell to have equal or substantially equal path lengths, which can help to increase or maximize the useable optical bandwidths and data rates that are achievable. Moreover, this design achieves a higher fill factor compared to a conventional H-tree design. In some cases, the fill factor of the inverted H-tree design can approach the fill factor of the Manhattan style design. This increases the range and field of regard of the inverted H-tree design compared to the conventional H-tree design (while still achieving improved bandwidths and data rates). In addition, this design supports inversion and/or left/right symmetry of the emissions associated with each unit cell. This can provide symmetric far-field on-axis emissions along the surface normal of the unit cells, which can be independent of 90° or 180° rotations and thereby enable the far-field emissions to overlap independent of antenna rotation.

Figure 1:
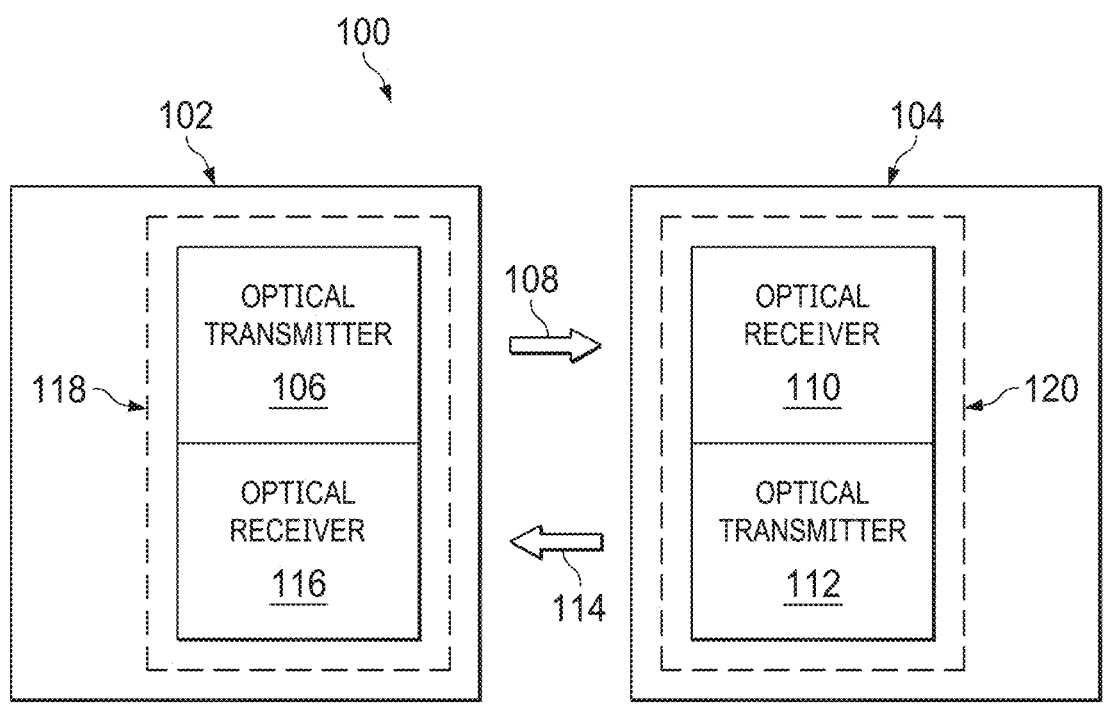
FIG. 1 illustrates an example system supporting optical communications using photonic integrated circuits with an inverted H-tree unit cell design according to this disclosure.

FIG. 1 illustrates an example system 100 supporting optical communications using photonic integrated circuits with an inverted H-tree unit cell design according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes.

As described in more detail below, each of the optical transmitters 106 and 112, optical receivers 110 and 116, or optical transceivers 118 and 120 includes at least one photonic integrated circuit that implements at least one optical phased array. Each optical phased array may implement or be designed using an inverted H-tree unit cell design. For example, each unit cell of an optical phased array may include four collections of antenna elements, where the antenna elements are coupled to or otherwise associated with waveguides having an "H" type of arrangement and where different collections of antenna elements point in opposite directions.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting optical communications using photonic integrated circuits with an inverted H-tree unit cell design, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers. In addition, the system 100 is shown in simplified form here and may include any number of additional components in any suitable configuration as needed or desired.

Figure 2:
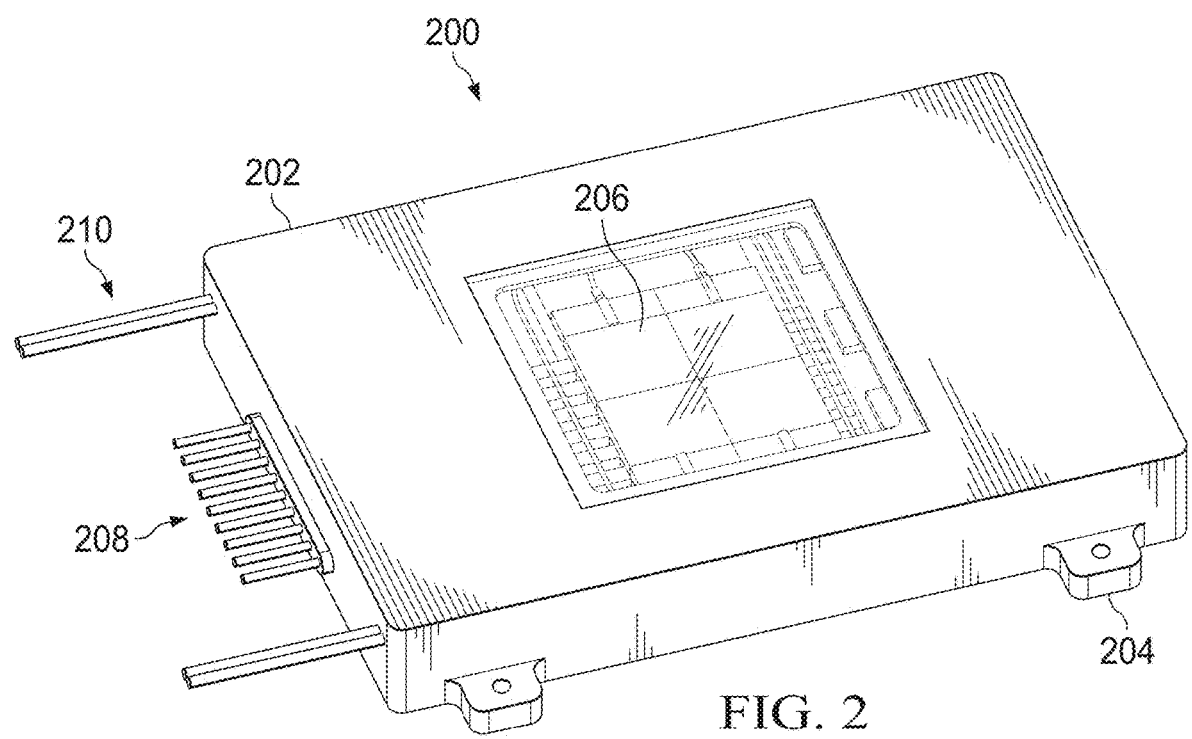
FIGS. 2 through 5 illustrate an example optical device with a photonic integrated circuit having an inverted H-tree unit cell design according to this disclosure.

FIGS. 2 through 5 illustrate an example optical device 200 with a photonic integrated circuit having an inverted H-tree unit cell design according to this disclosure. The optical device 200 here may represent a specific implementation of at least a portion of an optical node 102 or 104 described above. As shown in FIG. 2, the optical device 200 includes a package 202, which surrounds and protects electronic and optical components of an optical transmitter, optical receiver, or optical transceiver. For example, the package 202 may encase and form a hermetic seal around the electronic and optical components. The package 202 may be formed from any suitable material(s), such as one or more metals, and in any suitable manner. In some embodiments, the package 202 is formed using a nickel-cobalt or nickel-iron alloy (such as KOVAR) or other material that has a coefficient of thermal expansion closely matched to that of borosilicate or other glass. The package 202 may also have any suitable size, shape, and dimensions, In some cases, the package 202 may be formed in multiple parts that can be bonded, sealed, or otherwise coupled together to enclose the electronic and optical components. For instance, the package 202 may be formed using a larger lower portion and an upper cover such that the electronic and optical components can be inserted into the lower portion and the upper cover can be connected to the lower portion. Also, in some cases, the package 202 may include flanges 204 that support mounting of the package 202 to a larger structure. However, the package 202 may have any other suitable form.

The package 202 includes an optical window 206, which is substantially or completely transparent optically (at least with respect to the optical signals being transmitted from or received by the optical device 200). The optical window 206 may be formed from any suitable material(s), such as borosilicate glass or other glass, and in any suitable manner. The optical window 206 may also have any suitable size, shape, and dimensions. In some cases, the optical window 206 may also function as a band pass or other optical filter that filters the wavelength(s) of the optical signals being transmitted from or received by the optical device 200.

The package 202 may also include one or more electrical feed throughs 208, which represent one or more electrical connections that can be used to transport one or more electrical signals between the interior and the exterior of the package 202. The one or more electrical signals may be used here for any suitable purposes, such as to control one or more operations of the optical device 200. As a particular example, the one or more electrical signals may be used for controlling the phases of antenna elements of a photonic integrated circuit in the optical device 200. In addition, the package 202 may include one or more fiber inputs/outputs 210, which can be used to provide one or more input signals to the optical device 200 and/or receive one or more output signals from the optical device 200. The one or more input signals may carry information to be transmitted from the optical device 200. The one or more output signals may carry information received at and recovered by the optical device 200. In this example, there are two fiber inputs/outputs 210, although the optical device 200 may include a single fiber input/output 210 or more than two fiber inputs/outputs 210. Note, however, that no fiber inputs/outputs 210 may be needed if all optical generation and processing occurs using components within the package 202, in which case the electrical feedthroughs 208 may be used to transport information to or from the optical device 200.

Figure 3:
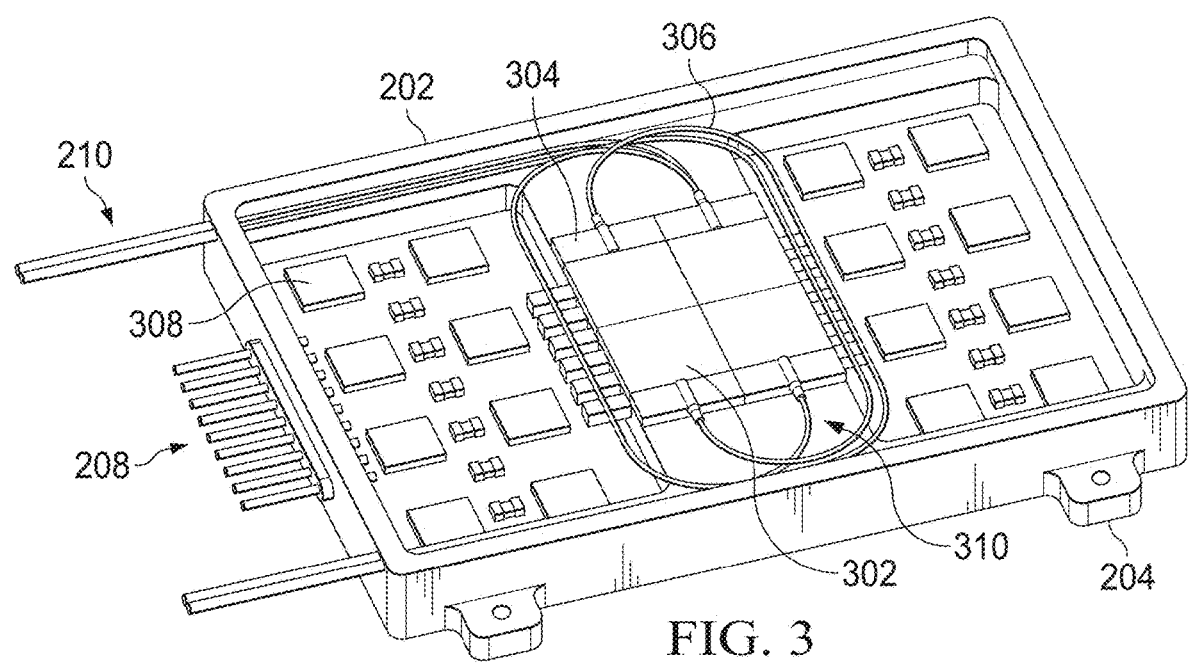

As shown in FIG. 3, a photonic integrated circuit 302 is positioned within the package 202, namely at a location where the photonic integrated circuit 302 can transmit and/or receive optical signals through the optical window 206. The photonic integrated circuit 302 may, for example, include a PIC-based optical phased array as described in more detail below. The photonic integrated circuit 302 can be used to support optical transmission and/or optical reception, depending on the design of the photonic integrated circuit 302, The photonic integrated circuit 302 may also support a number of additional optical functions as needed or desired. The photonic integrated circuit 302 may be formed from any suitable material(s), such as silicon, indium phosphide, or gallium arsenide, and in any suitable manner. The photonic integrated circuit 302 may also have any suitable size, shape, and dimensions. As a particular example, the photonic integrated circuit 302 may be square and have an edge length of about 40 mm, although any other suitable sizes and shapes may be used here.

Fiber mounts 304 are used to couple to optical fibers 306 at locations where the optical fibers 306 can provide optical signals to and/or receive optical signals from the photonic integrated circuit 302. For example, the optical fibers 306 may provide optical signals from a source laser to the photonic integrated circuit 302 for use during outgoing transmissions. The optical fibers 306 may also or alternatively provide optical signals received by the photonic integrated circuit 302 to a receiver for processing. Each fiber mount 304 includes any suitable structure configured to be coupled to an optical fiber 306. Each optical fiber 306 represents any suitable length of an optical medium configured to transport optical signals to or from a photonic integrated circuit 302, Note that while four fiber mounts 304 and four optical fibers 306 are shown here, the optical device 200 may include, one, two, three, or more than four fiber mounts 304 and optical fibers 306, Also note that no fiber mounts 304 and optical fibers 306 may be needed if all optical generation and processing occurs using components of the photonic integrated circuit 302.

An electronic control board 308 includes electronic components, such as one or more integrated circuit chips and other components, that control the operation of the photonic integrated circuit 302. For example, the electronic control board 308 may include one or more components that calculate desired phases or phase corrections for optical signals to be generated by antenna elements of the photonic integrated circuit 302, which allows the electronic control board 308 to control functions such as beam forming or beam steering operations. Also or alternatively, the electronic control board 308 may include one or more components that calculate desired phases or phase corrections to be applied to optical signals received by antenna elements of the photonic integrated circuit 302, which allows the electronic control board 308 to control functions such as wavefront reconstruction operations. The electronic control board 308 includes any suitable components configured to perform one or more desired functions related to a photonic integrated circuit 302.

Spacers 310 may be positioned on opposite sides of the photonic integrated circuit 302 and used to help separate the optical fibers 306 from the electronic control board 308. The spacers 310 may be formed from any suitable material(s), such as ceramic, and in any suitable manner.

Figure 4:
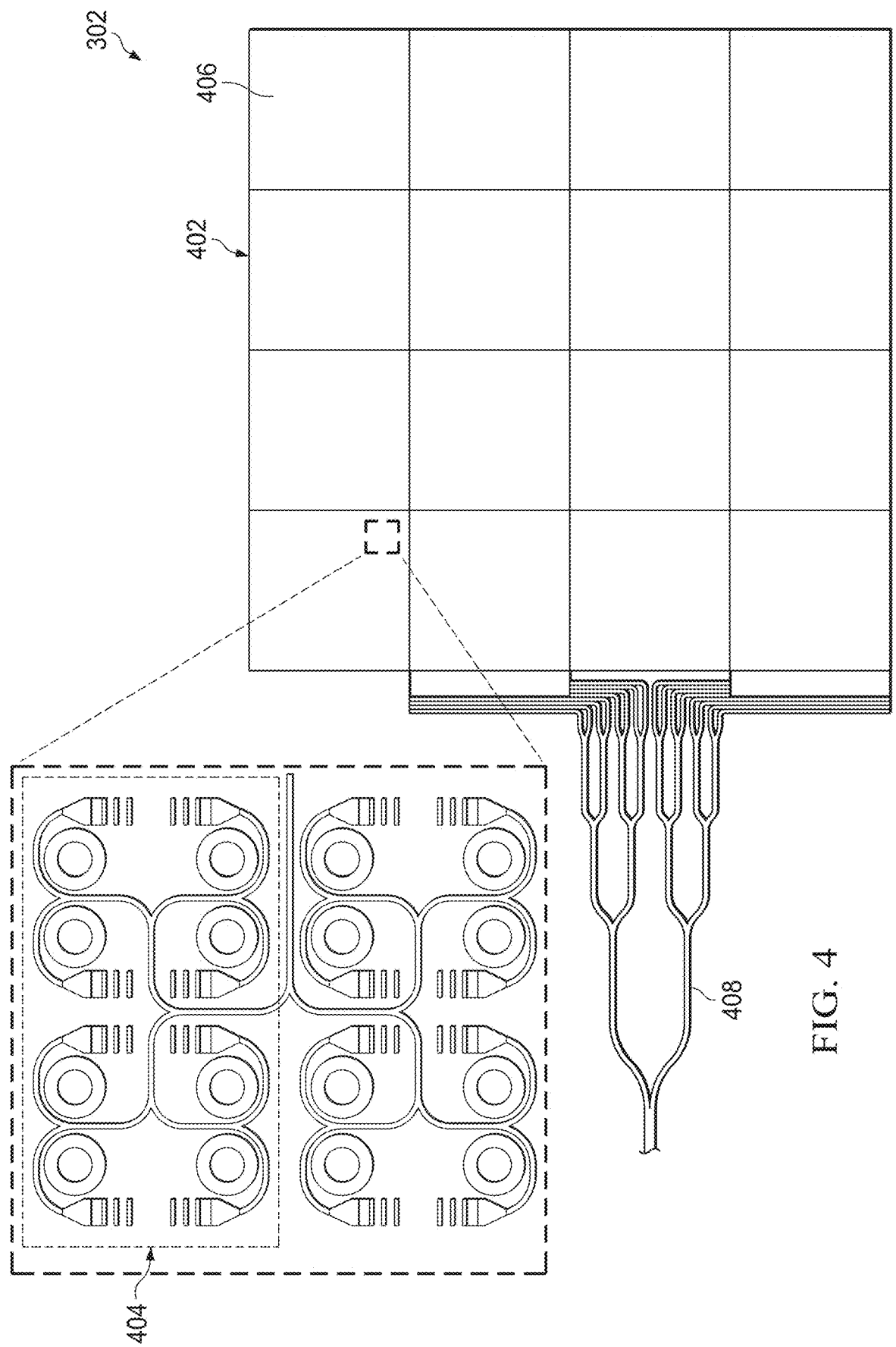

As shown in FIG. 4, the photonic integrated circuit 302 includes a PIC-based optical phased array 402, where the optical phased array 402 includes a large number of unit cells 404. Each unit cell 404 is configured to transmit or receive optical signals. As described in more detail below, each unit cell 404 includes an inverted H-tree design having multiple antenna elements and multiple phase modulators. The phase modulators are configured to modulate the phases of optical signals flowing through signal pathways of the unit cell 404.

The optical phased array 402 can include any suitable number of unit cells 404, possibly up to and including a very large number of unit cells 404. In some embodiments, for example, the optical phased array 402 may include an array of antenna elements up to a size of 1024×1024 (meaning over one million antenna elements) or even larger. Also, the optical phased array 402 may include multiple groups 406 of unit cells 404, where the unit cells 404 in each group 406 are fed an outgoing optical signal or are used to generate an incoming optical signal. In some embodiments, for example, the optical phased array 402 may include sixteen groups 406 of unit cells 404 arranged in a 4×4 pattern, although other numbers and arrangements of groups 406 of unit cells 404 may be used. The size of the optical phased array 402 is based, at least in part, on the number and size of the unit cells 404 and the number and arrangement of the groups 406. The optical phased array 402 may be scaled to various sizes as needed or desired.

A feed network 408 is used to split outgoing optical signals for transmission by the optical phased array 402 or to combine incoming optical signals received by the optical phased array 402. For example, the feed network 408 may include a collection of splitters/combiners that can divide optical signals flowing in one direction through the feed network 408 and combine optical signals flowing in the opposite direction through the feed network 408. In some cases, the feed network 408 can be designed to feed optical signals to or receive optical signals from the groups 406 of unit cells 404. Additional components within the optical phased array 402 (such as within each group 406 of unit cells 404) may be used to provide optical signals to or receive optical signals from the individual unit cells 404 within the optical phased array 402. The feed network 408 includes any suitable structures configured to distribute or combine optical signals. While a specific configuration of a feed network 408 is shown here, the actual design of the feed network 408 can vary based on a number of factors, such as the design of the optical phased array 402.

Figure 5:
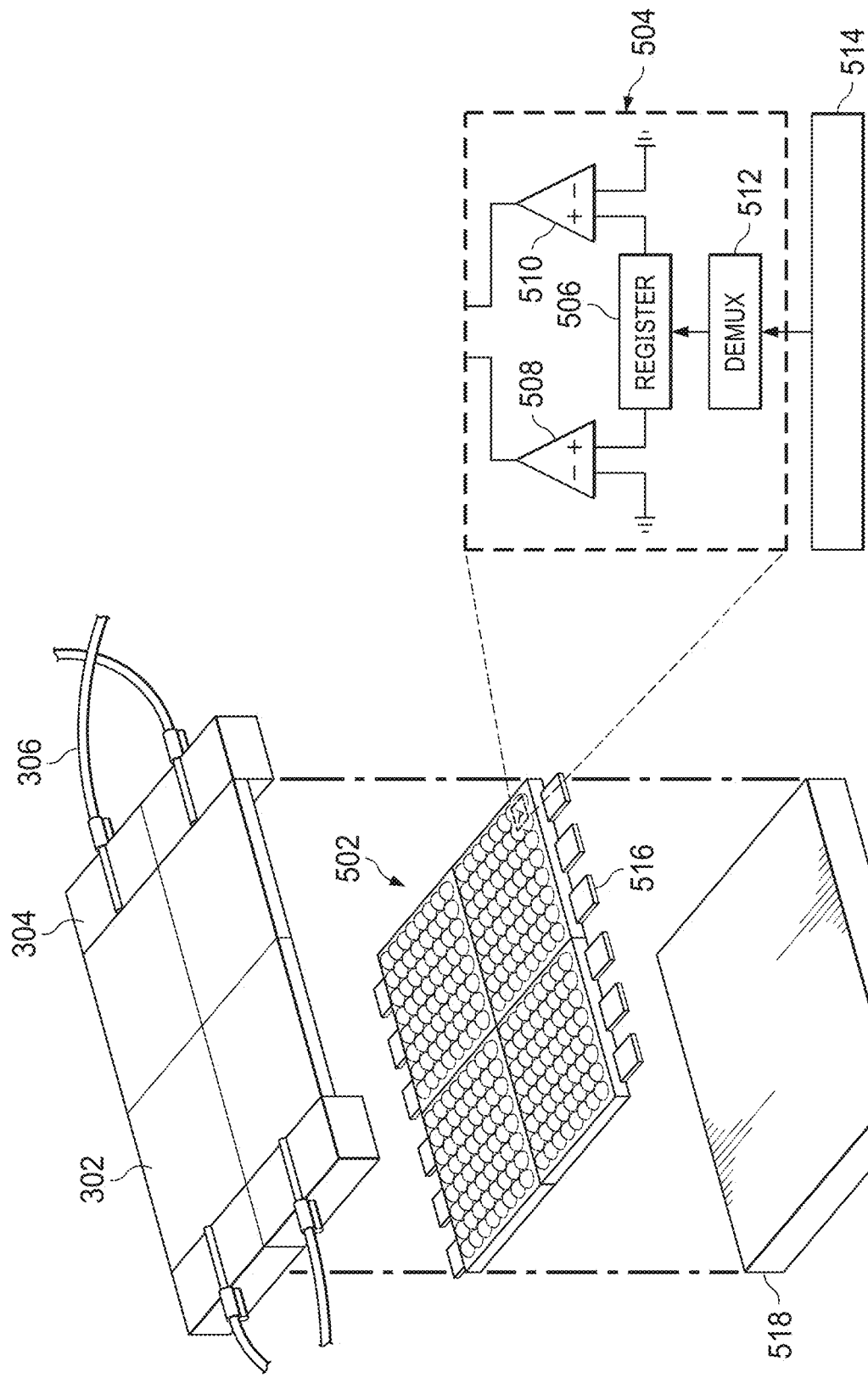

As shown in FIG. 5, the photonic integrated circuit 302 is electrically coupled to a digital read in integrated circuit (DRIIC) layer 502. Among other things, the DRIIC layer 502 may be used to provide electrical signals to phase modulators in the unit cells 404 of the optical phased array 402 in order to control phase modulations applied to incoming or outgoing optical signals by the phase modulators. In some embodiments, the photonic integrated circuit 302 can be "flip-chip" bonded to the DRIIC layer 502, although other mechanisms for electrically coupling the photonic integrated circuit 302 and the DRIIC layer 502 may be used.

The DRIIC layer 502 in this example includes a number of individual DRIIC cells 504, where four DRIIC cells 504 may be associated with (and in some cases may have about the same size as) a corresponding unit cell 404 in the optical phased array 402. The DRIIC cells 504 control the phase modulations that are applied by the phase modulators of the unit cells 404 in the optical phased array 402. The DRIIC cells 504 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 504 may operate to convert digital values into suitable DC analog voltages between 0 V and 3.3 V, although other voltages (including negative voltages) can be supported depending on the implementation.

In this example, each DRIIC cell 504 may include a register 506 configured to store values associated with different phase shifts to be applied by one of the phase modulators of the corresponding unit cell 404 in the optical phased array 402. To provide a desired phase shift, appropriate values from the register 506 are selected and provided to two amplifiers 508 and 510, which generate output voltages that are provided to the associated phase modulator in the unit cell 404 of the optical phased array 402. The output voltages control the phase shift provided by the associated phase modulator. Different values from the register 506 are provided to the amplifiers 508 and 510 over time so that different output voltages are applied to the associated phase modulator. In this way, each DRIIC cell 504 can cause its associated phase modulator to provide different phase shifts over time, thereby supporting various functions like beam forming, beam steering, or wavefront reconstruction.

In some embodiments, each DRIIC cell 504 may be used to provide a relatively small number of different output voltages to its associated phase modulator. For example, in some cases, each DRIIC cell 504 can cause the associated phase modulator to provide four different phase shifts. However, other numbers of output voltages and associated phase shifts may be supported here, such as when up to 256 different phase shifts or more are supported. Also, the output voltages provided to the phase modulators in the unit cells 404 of the optical phased array 402 by different DRIIC cells 504 may be different even when those phase modulators are providing the same phase shift, which may be due to factors such as manufacturing tolerances. The actual output voltages used for each phase modulator can be selected during calibration so that appropriate values may be stored in each register 506.

In this example, the actual values in each DRIIC cell 504 that are provided to the amplifiers 508 and 510 by the register 506 over time can be controlled using a demultiplexer 512. Each demultiplexer 512 receives a stream of computed array phase shifts 514 and outputs the phase shifts 514 that are to be applied by that DRIIC cell's associated phase modulator. The phase shifts 514 output by the demultiplexer 512 can identify or otherwise to be used to select specific values from the register 506 to be output to the amplifiers 508 and 510. The computed array phase shifts 514 here may be provided by one or more external components, such as the electronic control board 308 or an external component communicating with the electronic control board 308. While not shown here, array-level deserialization circuitry may be used to separate and fan out high-speed digital signals to the array of individual DRIIC cells 504.

Each register 506 includes any suitable structure configured to store and retrieve values. Each amplifier 508 and 510 includes any suitable structure configured to generate a control voltage or other control signal based on an input.

Each demultiplexer 512 includes any suitable structure configured to select and output values.

Note that this represents one example way in which the phase modulators of the unit cells 404 in the optical phased array 402 can be controlled. In general, any suitable technique may be used to provide suitable control voltages or other control signals to the phase modulators for use in controlling the phase shifts provided by the phase modulators. For example, the approach shown in FIG. 5 allows values that are applied to the amplifiers 508 and 510 to be stored in the register 506 and retrieved as needed, which allows an external component to provide indicators of the desired values to be retrieved to the DRIIC cells 504. In other embodiments, an external component may provide digital values that are converted by different circuitry into analog values.

Various electrical connections 516 are provided in or with the DRIIC layer 502. The electrical connections 516 may be used to provide electrical signals to the DRIIC cells 504, such as when the electrical connections 516 are used to receive high-speed digital signals containing the computed array phase shifts 514 for the DRIIC cells 504. Any suitable number and arrangement of electrical connections 516 may be used here.

A thermal spreader 518 can be positioned in thermal contact with the DRIIC layer 502. The thermal spreader 518 helps to provide a more consistent temperature across the DRIIC layer 502 and the photonic integrated circuit 302 by functioning as a heat sink that removes thermal energy from the DRIIC layer 502 and the photonic integrated circuit 302. At times, the thermal spreader 518 may also provide thermal energy to the DRIIC layer 502, which helps to heat the DRIIC layer 502 and the photonic integrated circuit 302. Thermal energy that is generated by the DRIIC layer 502 and/or injected into the photonic integrated circuit 302 may vary over time, and the thermal spreader 518 can help to maintain a substantially constant temperature of the photonic integrated circuit 302. The thermal spreader 518 may be formed from any suitable material(s), such as one or more metals like copper, and in any suitable manner. The thermal spreader 518 may also have any suitable size, shape, and dimensions.

Although FIGS. 2 through 5 illustrate one example of an optical device 200 with a photonic integrated circuit having an inverted H-tree unit cell design, various changes may be made to FIGS. 2 through 5. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits. Further, the photonic integrated circuit 302 may have any other suitable size and shape, and any other suitable feed network 408 may be used. In addition, while the feed network 408 is shown here as residing next to the photonic integrated circuit 302, the feed network 408 may be located in any other suitable position(s), such as under the photonic integrated circuit 302.

Figure 6:
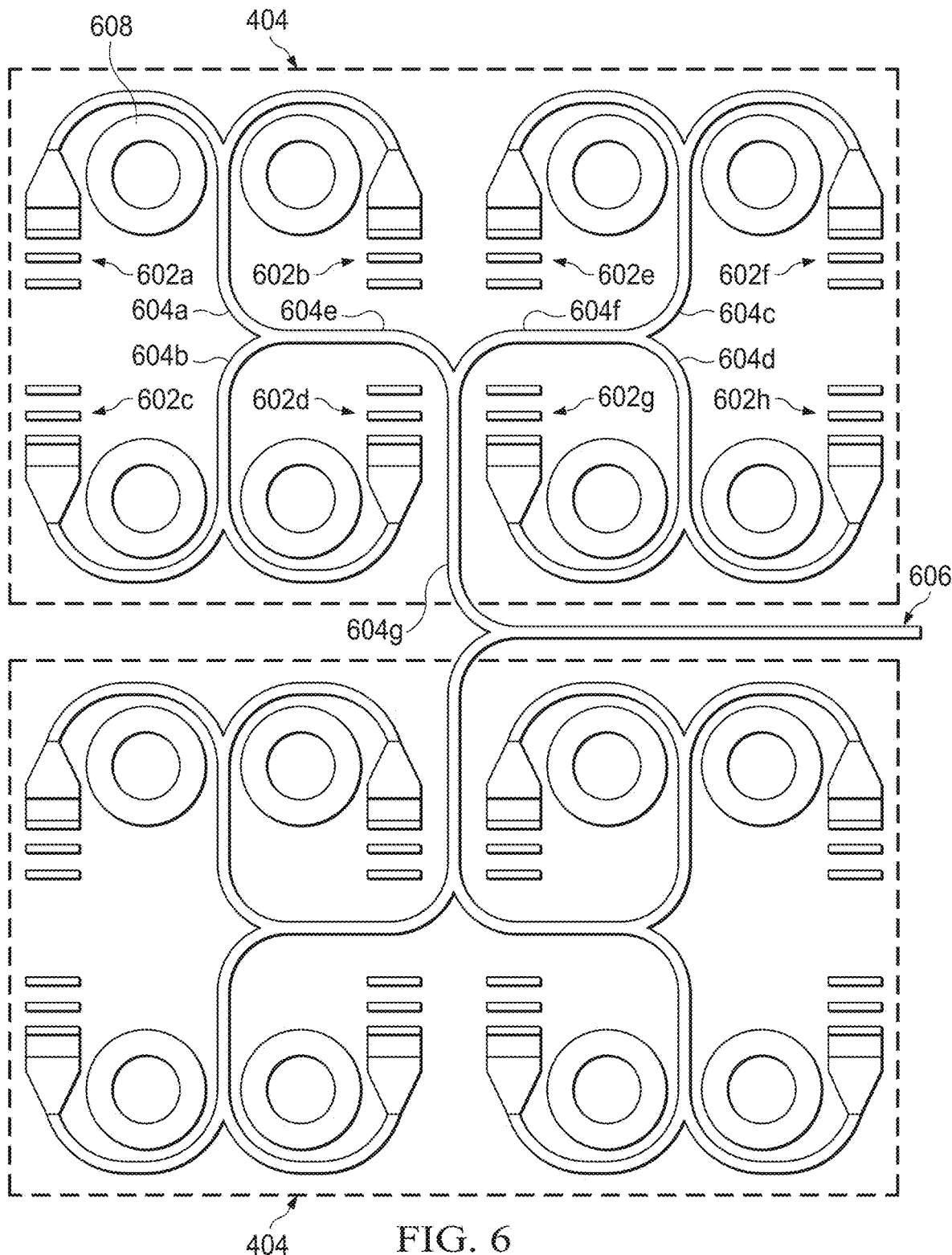
FIG. 6 illustrates an example inverted H-tree unit cell design for a photonic integrated circuit according to this disclosure.

FIG. 6 illustrates an example inverted H-tree unit cell design for a photonic integrated circuit according to this disclosure. For ease of explanation, FIG. 6 is described as illustrating an example design for each unit cell 404 of the optical phased array 402 in the photonic integrated circuit 302 described above. Also, the unit cell design may be used in the nodes 102 and 104 described above. However, the unit cell design may be used in any other suitable optical phased array, in any other suitable optical device, and in any other suitable system.

As shown in FIG. 6, each unit cell 404 of the optical phased array 402 includes multiple antenna elements 602a-602h, each of which is configured to physically transmit or receive one or more optical signals to or from one or more external devices or systems. For example, each antenna element 602a-602h may represent a nanophotonic antenna or other antenna element that transmits or receives at least one optical signal, along with one or more lenses or other optical devices configured to focus or otherwise process the at least one optical signal. Depending on the implementation, each antenna element 602a-602h may sometimes be referred to as an emitter in a transmitting array or a receiver in a receiving array. Each antenna element 602a-602h may have any suitable size, shape, and dimensions. In some cases, the emitting/receiving surface of each antenna element 602a-602h may be about 3 μm to about 4 μn in diameter.

Each unit cell 404 of the optical phased array 402 also includes various signal pathways 604a-604g. The signal pathways 604a-604g are configured to transport optical signals to or from the antenna elements 602a-602h. For example, the signal pathways 604a-604g can provide optical signals to the antenna elements 602a-602h for transmission. Also or alternatively, the signal pathways 604a-604g can provide optical signals received by the antenna elements 602a-602h to optical detectors or other components for processing, such as via the feed network 408. Each signal pathway 604a-604g includes any suitable structure configured to transport optical signals, such as an optical waveguide.

In this example, the antenna elements 602a-602h are arranged in four collections (four pairs in this example). The antenna elements 602a-602b form a first collection and are optically coupled to the signal pathway 604a, the antenna elements 602c-602d form a second collection and are optically coupled to the signal pathway 604b, the antenna elements 602e-602f from a third collection and are optically coupled to the signal pathway 604c, and the antenna elements 602g-602h form a fourth collection and are optically coupled to the signal pathway 604d. The signal pathways 604a-604b are optically coupled to the signal pathway 604e, and the signal pathways 604c-604d are optically coupled to the signal pathway 604f. In addition, the signal pathways 604e-604f are optically coupled to the signal pathway 604g. This design allows optical signals to flow to or from the antenna elements 602a-602h of each unit cell 404 through the signal pathway 604g in that unit cell 404. Also, in this arrangement, the signal pathways 604a-604f are said to represent or form an "H" type of shape. In addition, the signal pathways 604g of multiple unit cells 404 may be optically coupled to a common signal pathway 606, which includes any suitable structure configured to transport optical signals (such as an optical waveguide). The common signal pathway 606 may be coupled to the feed network 408 directly or through one or more additional signal pathways.

In this layout, the antenna elements 602a-602h of a unit cell 404 can have equal or substantially equal path lengths. For example, a path length may be defined as the distance between (i) the location where the signal pathway 606 splits and (ii) the location of an antenna element 602a-602h in a unit cell 404. The layout shown in FIG. 6 can enable the antenna elements 602a-602h of each unit cell 404 to have equal or substantially equal path lengths with respect to each other. The ability to have equal or substantially equal path lengths can increase or maximize the useable optical bandwidth and data rate that is achievable using the unit cells 404. Moreover, it can be seen here that two collections of antenna elements (namely antenna elements 602*a*-602*b* and 602*e*-602*f*) face a common direction, while two other collections of antenna elements (namely antenna elements 602*c*-602*d* and 602*g*-602*h*) face substantially the opposite direction. This arrangement can provide symmetric far-field on-axis emissions along a surface that is normal to the unit cells 404, which enables the far-field emissions to overlap independent of antenna rotation. In this particular example, the antenna elements 602*a*-602*h* are arranged in rows, where the antenna elements in adjacent rows point in opposite directions.

A phase modulator 608 is provided for each antenna element 602*a*-602*h* and is used (among other things) to control the phases of optical signals transmitted or received by the associated antenna element 602*a*-602*h*. For example, when at least one of the antenna elements 602*a*-602*h* is transmitting in a unit cell 404, the phase modulators 608 can be used to achieve desired phases of outgoing optical signals in order to perform beam forming or beam steering. When at least one of the antenna elements 602*a*-602*h* is receiving in a unit cell 404, the phase modulators 608 can be used to apply phase control to the incoming wavefront of received optical signals in order to decompose or reconstruct the wavefront. Each phase modulator 608 includes any suitable structure configured to modulate the phase of one or more optical signals, such as a resonant micro-ring modulator or a PN junction micro-ring modulator. In some cases, each phase modulator 608 may be a resonant micro-ring modulator that is about 5.5 μm to about 6 μm in diameter, although modulators of other sizes may be used here.

Although FIG. 6 illustrates one example of an inverted H-tree unit cell design for a photonic integrated circuit, various changes may be made to FIG. 6. For example, the inverted H-tree unit cell design may include any suitable number of antenna elements and associated signal pathways and phase modulators. As a particular example, while each collection of antenna elements here includes two antenna elements, each collection of antenna elements may include a single antenna element or more than two antenna elements. Thus, each inverted H-tree unit cell design may generally include a first subset of antenna elements and a second subset of antenna elements, where the first and second subsets of antenna elements are oriented in or face opposite directions. Also, the specific paths shown for the signal pathways 604*a*-604*g*, 606 can vary from those shown here.

FIGS. 7A. 7B, and 8 illustrate an example antenna element 602*a*-602*h* in a photonic integrated circuit having an inverted H-tree unit cell design according to this disclosure. More specifically, FIGS. 7A and 7B illustrate example perspective views of the antenna element 602*a*-602*h*, and FIG. 8 illustrates an example cross-sectional view of part of a unit cell including the antenna element 602*a*-602*h*. For ease of explanation, the antenna element 602*a*-602*h* shown here is described as being used in the unit cell design of FIG. 6 within each unit cell 404 of the optical phased array 402 in the photonic integrated circuit 302 described above. Also, the antenna element 602*a*-602*h* may be used in the nodes 102 and 104 described above. However, the antenna element 602*a*-602*h* may be used in any other suitable inverted H-tree unit cell design, any other suitable optical phased array, any other suitable optical device, and any other suitable system.

As shown in FIGS. 7A and 7B, each antenna element 602*a*-602*h* may include or be associated with a signal line 702, which may represent a portion of an associated signal pathway 604*a*-604*g* or a portion of the antenna element 602*a*-602*h* coupled to the associated signal pathway 604*a*-604*g*. Each antenna element 602*a*-602*h* also includes an emitting/receiving surface 704 that is coupled to the signal line 702 via a tapered section 706. The emitting/receiving surface 704 is generally configured to transmit outgoing optical signals or receive incoming optical signals. The tapered section 706 represents a portion of the antenna element 602*a*-602*h* that increases in size from the smaller width of the signal line 702 to the larger width of the emitting/receiving surface 704. The emitting/receiving surface 704 includes a notch 708, which extends across the width of the emitting/receiving surface 704 and extends partially (but not completely) through the depth of the emitting/receiving surface 704. One or more reflectors 710 are positioned adjacent to the emitting/receiving surface 704.

In some embodiments, a grating 712 may optionally be positioned over the emitting/receiving surface 704 and reflector(s) 710 of the antenna element 602*a*-602*h*. The grating 712 may help to perturb the transmissions or receptions by the antenna element 602*a*-602*h* to make the transmissions or receptions more symmetrical. The grating 712 may also or alternatively help the transmissions or receptions by the antenna element 602*a*-602*h* to occur more orthogonally relative to a plane of the antenna element 602*a*-602*h*.

Each of the signal line 702, emitting/receiving surface 704, tapered section 706, and reflector(s) 710 may be formed from any suitable materials) (such as silicon or silicon nitride) and in any suitable manner. In some cases, these components may be formed by depositing one or more materials on another layer and etching the deposited material(s). The grating 712 may also be formed from any suitable material(s) (such as one or more metals or silicon nitride) and in any suitable manner. In some cases, the grating 712 may be formed by depositing one or more suitable materials on another layer and etching the deposited material(s).

In particular embodiments, the antenna element 602*a*-602*h* may have the following features. A width 750 of the signal line 702 may be about 0.34 μm to about 0.36 μm, and a height or depth 752 of the signal line 702 may be about 0.22 μm. A length 754 of the tapered section 706 may be about 4.0 μm, and a length 756 of a front portion of the emitting/receiving surface 704 may be about 0.55 μm. A length 758 of the notch 708 may be about 0.75 μm, a length 760 of a back portion of the emitting/receiving surface 704 and each reflector 710 may be about 0.2 μm, and a width 762 of the emitting/receiving surface 704 and each reflector 710 may be about 2.0 μm. A separation 764 between the emitting/receiving surface 704 and a first reflector 710 may be about 0.55 μm, and a separation 766 between adjacent pairs of reflectors 710 may be about 0.65 μm. Note, however, that these values are for illustration only and can vary depending on the implementation.

As shown in FIG. 8, in some embodiments, the antenna element 602*a*-602*h* and the optional grating 712 may be positioned within a layer 802 of material (such as a layer of silicon dioxide). A layer 804 of material (such as a layer of silicon nitride) may separate the layer 802 from a substrate layer 806 (such as a layer of silicon). A layer 808 of material (such as a layer of silicon nitride) may be positioned within a layer 810 of material (such as a layer of silicon dioxide). A lens 812 may be formed in the layer(s) 806, 810 to focus optical energy into the antenna element 602*a*-602*h* or expand optical energy from the antenna element 602*a*-602*h*.

Each of these layers and other structures may be formed using any suitable material(s) and in any suitable manner.

Although FIGS. 7A, 7B, and 8 illustrate one example of an antenna element 602a-602h in a photonic integrated circuit having an inverted H-tree unit cell design, various changes may be made to FIGS. 7A, 7B, and 8. For example, the antenna element 602a-602h may have any other suitable design enabling the antenna element 602a-602h to transmit or receive optical signals. Also, the specific dimensions, layers of material, and other details provided above relate to specific embodiments of the antenna element 602a-602h and do not limit this disclosure to these specific embodiments.

FIGS. 9 and 10 illustrate example cross-sections of portions of unit cells 404 in a photonic integrated circuit 302 having an inverted H-tree unit cell design according to this disclosure. For ease of explanation, the unit cells 404 of FIGS. 9 and 10 may be used in the optical phased array 402 of the photonic integrated circuit 302 described above. Also, the unit cells 404 may be used in the nodes 102 and 104 described above. However, the unit cells 404 may be used in any other suitable inverted H-tree unit cell design, any other suitable optical phased array, any other suitable optical device, and any other suitable system.

As shown in FIG. 9, each unit cell 404 may be fabricated as a multi-layer structure that uses components in various layers to implement the desired functions of the unit cell 404. In this example, the multi-layer structure includes a photonics layer 902, which represents the layer in which various photonic functions (such as waveguides/signal pathways and antenna elements) can be fabricated. The photonics layer 902 may be formed using any suitable material(s), such as silicon. The photonics layer 902 may also be formed in any suitable manner, such as by depositing material(s) on another layer and etching or otherwise processing the material(s). In addition, the photonics layer 902 may have any suitable dimensions, such as a thickness of about 220 nm.

Various layers 904a-904c and 906a-906b are positioned on one side of the photonics layer 902 and can provide electrical insulation or perform other functions. Each of the layers 904a-904c and 906a-906b may be formed using any suitable material(s). In some embodiments, each of the layers 904a-904c may be formed using silicon dioxide or other dielectric material, and each of the layers 906a-906b may be formed using silicon nitride. Each of the layers 904a-904c and 906a-906b may also be formed in any suitable manner, such as by depositing material(s) on another layer and etching or otherwise processing the material(s). In addition, each of the layers 904a-904c and 906a-906b may have any suitable dimensions. In some embodiments, the layer 904a may have a thickness of about 100 nm to about 1000 nm, each of the layers 904b-904c may have a thickness of about 100 nm, and each of the layers 906a-906b may have a thickness of about 220 nm.

An additional layer 908 is positioned on the opposite side of the photonics layer 902 and can provide electrical insulation or perform other functions. The layer 908 may be formed using any suitable material(s). In some embodiments, the layer 908 may be formed using silicon dioxide or other dielectric material. As a particular example, the layer 908 may represent a buried oxide (BOX) layer. The layer 908 may also be formed in any suitable manner, such as by depositing materials) on another layer and etching or otherwise processing the material(s). In addition, the layer 908 may have any suitable dimensions, In sonic embodiments, the layer 908 may have a thickness of about 2000 nm.

Depending on the implementation, antenna elements of the unit cell 404 may be fabricated in the photonics layer 902 or in one or more of the layers 906a-906h. In this example, it is assumed that the antenna elements of the unit cell 404 are fabricated in the photonics layer 902. Optical signals are provided to and/or received from the unit cell 404 using an optical fiber 910, which may represent an optical waveguide or other suitable structure. Electrical signals used by the unit cell 404 (such as signals for controlling the phase modulators of the unit cell 404) are provided to the unit cell 404 using one or more conductive vias 912. The one or more conductive vias 912 are electrically coupled to conductive pads 914, which may contact one or more solder bumps 916 (such as indium solder bumps) carried by an interposer layer 918. The layers 904c and 918 can be separated from one another by any suitable distance to accommodate the conductive pads 914, solder bumps 916, or other components, such as a distance of about 1110 nm. Note, however, that any other suitable mechanisms may be used to transport optical and electrical signals to and from the unit cell 404.

A carrier layer 920 represents a substrate or other layer of material that is used to carry the unit cell 404. The carrier layer 920 may be formed using any suitable material(s), such as silicon. The carrier layer 920 may also be formed in any suitable manner. In addition, the carrier layer 920 may have any suitable dimensions, such as a thickness of about 775 or more.

As shown in this particular example, the unit cell 404 is configured to transmit and/or receive optical signals 922. The unit cell 404 may optionally include one or more antenna modifiers 924a-924b, each of which may represent one instance of the grating 712 described above. Here, the antenna modifiers 924a-924b are shown as respectively residing within the layers 906a-906b. In some embodiments, the unit cell 404 includes a single instance of an antenna modifier 924a-924b in one of the layers 906a-906b.

The unit cell 404 shown in FIG. 10 contains many of the same layers as the unit cell 404 shown in FIG. 9. However, in FIG. 10, the unit cell 404 is configured to transmit and/or receive optical signals 1022 in an opposite direction compared to the unit cell 404 of FIG. 9. This can be accomplished using one or more reflectors 1002a-1002c, which in this example are shown as respectively residing within the layers 904a-904c. In some embodiments, the unit cell 404 includes a single instance of a reflector 1002a-1002c in one of the layers 904a-904c. Each reflector 1002a-1002c may be formed using any suitable reflective material(s), such as one or more metals. Each reflector 1002a-1002c may also be formed in any suitable manner, such as by depositing material(s) on another layer and etching or otherwise processing the material(s). In addition, each reflector 1002a-1002c may have any suitable dimensions, such as a length of about 100 nm to about 300 nm.

One or more quarter waveplates 926, 1026 may optionally be used in either of the unit cells 404 shown in FIGS. 9 and 10. Each quarter waveplate 926, 1026 may be configured to transform linearly-polarized light into circularly-polarized light and vice versa. Thus, the quarter waveplate 926, 1026 can transform linearly-polarized light received from the antenna element 602a-602h into circularly-polarized light for outgoing transmission. The quarter waveplate 926, 1026 can also or alternatively transform incoming circularly-polarized light that is received into linearly-polarized light for reception by the antenna element 602a-602h. This can help to provide rotational insensitivity to the unit cells 404, meaning transmitting and receiving optical devices may effectively interact even if one optical device rotates relative to the other.

Each quarter waveplate 926, 1026 may be formed using any suitable material(s), such as at least one birefringent material, metamaterial, or polymer. In some embodiments, each quarter waveplate 926, 1026 may be formed using quartz or one or more polymers. Also, each quarter waveplate 926, 1026 may be formed in any suitable manner, such as by depositing material(s) on another layer and etching or otherwise processing the material(s). In addition, each quarter waveplate 926, 1026 may have any suitable dimensions. In some embodiments, each quarter waveplate 926, 1026 is substantially planar or flat on top and bottom surfaces. In other embodiments, each quarter waveplate 926, 1026 has a stepped or curved top or bottom surface. In particular embodiments, each quarter waveplate 926, 1026 can be implemented using a "zero order" waveplate, which means that each quarter waveplate 926, 1026 may have little if any operational variation based on temperature. In other particular embodiments, each quarter waveplate 926, 1026 may be formed using two "multiple order" quartz waveplates or other waveplates having their axes crossed, where one waveplate is stacked on top of the other.

Although FIG. 9 and 10 illustrate examples of cross-sections of portions of unit cells 404 in a photonic integrated circuit having an inverted H-tree unit cell design, various changes may be made to FIGS. 9 and 10. For example, various layers in the unit cells 404 may be combined, further subdivided, replicated, omitted, or rearranged and additional layers may be added according to particular needs. In general, any of the unit cells 404 described in this disclosure may be implemented in any suitable manner using any suitable layers of material. Also, the specific materials and dimensions of the various layers described above are for illustration only and can vary as needed or desired.

FIGS. 11 and 12 illustrate example phase modulators for use in a photonic integrated circuit having an inverted H-tree unit cell design according to this disclosure. In particular, FIGS. 11 and 12 illustrate example phase modulators 608 that may be used in the unit cells 404 of the optical phased array 402.

As shown in FIG. 11, the phase modulator 608 here represents a thermal resonator that is implemented using a micro-ring resonator 1102 and a heater 1104 positioned above or otherwise near the micro-ring resonator 1102. The micro-ring resonator 1102 resonates based on one or more optical signals flowing through the associated signal pathway. Varying the temperature of the micro-ring resonator 1102 alters the resonance wavelength of the micro-ring resonator 1102, thereby changing the phase(s) of the optical signal(s) flowing through the associated signal pathway. Voltages can be applied to two electrical contacts 1106 of the heater 1104 in order to create the desired temperature change and therefore implement the desired phase shift(s) of the optical signal(s) flowing through the associated signal pathway. Different voltages applied to the heater 1104 can cause different phase shifts to occur in the phase modulator 608.

The micro-ring resonator 1102 may be formed from any suitable material(s), such as silicon, and in any suitable manner. The heater 1104 may be formed from any suitable material(s), such as one or more metals, and in any suitable manner. The micro-ring resonator 1102 may be separated from the heater 1104 by any suitable material(s), such as silicon dioxide. The micro-ring resonator 1102 and heater 1104 may each have any suitable size, shape, and dimensions. In some embodiments, the micro-ring resonator 1102 is annular and has a diameter of about 6 μm, and the heater 1104 is crescent-shaped and has a diameter of about 6 μm. However, other shapes and sizes may be used here. A gap 1108 between the micro-ring resonator 1102 and the associated signal pathway may have any suitable value, such as about 150 nm to about 210 nm (±10 nm). In sonic cases, design parameters like the thickness of the micro-ring resonator 1102 or the size of the gap 1108 can be altered in order to provide desired functionality for the phase modulator 608.

As shown in FIG. 12, the phase modulator 608 here represents a PN junction micro-ring modulator that is implemented using various regions of semiconductor material, such as doped and undoped silicon. In this example, the phase modulator 608 is shown in cross-section for explanation. Here, the phase modulator 608 includes a first annular semiconductor region 1202 separated from a second annular semiconductor region 1204. The annular semiconductor regions 1202 and 1204 can represent different types of semiconductor material, such as when the annular semiconductor region 1202 represents an N-type semiconductor material and the annular semiconductor region 1204 represents a P-type semiconductor material. A semiconductor region 1206 (such as undoped silicon) can separate the regions 1202-1204. A doped semiconductor region 1208 is positioned within the annular regions 1202-1204, and a doped semiconductor region 1210 is positioned around an upper portion of the doped semiconductor region 1208. The doped semiconductor regions 1208 and 1210 can represent different regions of semiconductor material with different dopants, such as when the doped semiconductor region 1208 is doped with an N+ dopant and the doped semiconductor region 1210 is doped with a P+ dopant. An electrical contact 1212 can be used to form an electrical connection with the doped semiconductor region 1208, and an electrical contact 1214 can be used to form an electrical connection with the doped semiconductor region 1210. An electrical connection 1216 can be used to provide a voltage to the electrical contact 1212, and an electrical connection 1218 can be used to provide a voltage to the electrical contact 1214.

Here, the various semiconductor regions 1202-1210 form a PN junction micro-ring modulator, and the electrical contacts 1212 and 1214 and electrical connections 1216 and 1218 allow voltages to be applied that alter the charge carrier density of the PN junction micro-ring modulator. This alters the phase of one or more optical signals flowing through the associated signal pathway. Voltages applied to the electrical connections 1216 and 1218 can provide the desired voltage difference and therefore implement the desired phase shift(s) of the optical signal(s) flowing through the associated signal pathway. Different voltages applied to the electrical connections 1216 and 1218 can cause different phase shifts to occur in the phase modulator 608.

Although FIGS. 11 and 12 illustrate examples of phase modulators for use in a photonic integrated circuit having an inverted H-tree unit cell design, various changes may be made to FIGS. 11 and 12. For example, the actual structure of a thermal resonator or PN junction micro-ring modulator can vary as needed or desired. Also, any other suitable structure may be used to phase-modulate one or more optical signals in the photonic integrated circuit 302 described above.

The following describes example embodiments of this disclosure that implement or relate to a photonic integrated circuit with an inverted H-tree unit cell design. However, other embodiments may be used in accordance with the teachings of this disclosure.

In a first embodiment, an apparatus includes a photonic integrated circuit having an optical phased array, where the optical phased array includes multiple unit cells. Each unit cell includes multiple antenna elements configured to transmit or receive optical signals, where a first subset of the antenna elements is oriented in a first direction and a second subset of the antenna elements is oriented in a second direction opposite the first direction. Each unit cell also includes multiple signal pathways configured to transport the optical signals to or from the antenna elements, where at least some of the signal pathways have an "H" configuration. Each unit cell further includes multiple phase modulators configured to modify phases of the optical signals being transported through the signal pathways.

In a second embodiment, a method includes transmitting or receiving optical signals using a photonic integrated circuit having an optical phased array, where the optical phased array includes multiple unit cells. Each unit cell includes (i) multiple antenna elements that transmit or receive the optical signals, (ii) multiple signal pathways that transport the optical signals to or from the antenna elements, and (iii) multiple phase modulators that modify phases of the optical signals being transported through the signal pathways. In each unit cell, a first subset of the antenna elements is oriented in a first direction and a second subset of the antenna elements is oriented in a second direction opposite the first direction. Also, in each unit cell, at least some of the signal pathways have an "H" configuration.

In a third embodiment, an apparatus includes a photonic integrated circuit having an optical phased array, where the optical phased array includes multiple unit cells. Each unit cell includes multiple antenna elements configured to transmit or receive optical signals, where a first subset of the antenna elements is oriented in a first direction and a second subset of the antenna elements is oriented in a second direction opposite the first direction. Each unit cell also includes multiple signal pathways configured to transport the optical signals to or from the antenna elements, where at least some of the signal pathways have an "H"configuration. Each unit cell further includes multiple phase modulators configured to modify phases of the optical signals being transported through the signal pathways. In addition, each unit cell includes a grating associated with each antenna element, where the grating is positioned above or below at least an emitting/receiving surface and one or more reflectors of the associated antenna element. In each unit cell, the antenna elements include pairs of antenna elements, and the antenna elements of each pair are optically coupled to a common one of the signal pathways. Also, in each unit cell, path lengths to or from the antenna elements defined by the signal pathways are substantially equal to one another.

Any single one or any suitable combination of the following features may be used with the first, second, or third embodiment. In each unit cell, the antenna elements may be arranged in rows, the antenna elements in one or more first rows may point in the first direction, and the antenna elements in one or more second rows may point in the second direction. In each unit cell, the antenna elements may include pairs of antenna elements, and the antenna elements of each pair may be optically coupled to a common one of the signal pathways. In each unit cell, path lengths to or from the antenna elements defined by the signal pathways may be substantially equal to one another. Multiple ones of the unit cells may be coupled to an additional signal pathway. Each unit cell may further include a grating associated with each antenna element, where the grating may be positioned above or below at least an emitting/receiving surface and one or more reflectors of the associated antenna element. The unit cells may be formed using a stack of materials, and the stack of materials may further include a quarter waveplate configured to convert between a linear polarization of light and a circular polarization of light. Each unit cell may further include a lens configured to focus the received optical signals onto an associated one of the antenna elements or to expand the transmitted optical signals from the associated one of the antenna elements. Each phase modulator of each unit cell may include a thermal resonator having a microring resonator and a heater or a PN junction modulator. The optical phased array may be configured such that far-field on-axis emissions from the optical phased array overlap.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,""member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C, § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
 a photonic integrated circuit comprising an optical phased array, the optical phased array comprising multiple unit cells, each unit cell comprising:
  multiple antenna elements configured to transmit or receive optical signals, a first subset of the antenna elements oriented in a first direction, a second subset of the antenna elements oriented in a second direction opposite the first direction;
  multiple signal pathways configured to transport the optical signals to or from the antenna elements, at least some of the signal pathways having an "H" configuration; and
  multiple phase modulators configured to modify phases of the optical signals being transported through the signal pathways.

2. The apparatus of claim 1, wherein, in each unit cell:
 the antenna elements are arranged in rows;
 the antenna elements in one or more first rows point in the first direction; and
 the antenna elements in one or more second rows point in the second direction.

3. The apparatus of claim 1, wherein, in each unit cell:
 the antenna elements comprise pairs of antenna elements; and
 the antenna elements of each pair are optically coupled to a common one of the signal pathways.

4. The apparatus of claim 1, wherein, in each unit cell, path lengths to or from the antenna elements defined by the signal pathways are substantially equal to one another.

5. The apparatus of claim 1, wherein multiple ones of the unit cells are coupled to an additional signal pathway.

6. The apparatus of claim 1, wherein each unit cell further comprises a grating associated with each antenna element, the grating positioned above or below at least an emitting/receiving surface and one or more reflectors of the associated antenna element.

7. The apparatus of claim 1, wherein:
 the unit cells are formed using a stack of materials; and
 the stack of materials further comprises a quarter waveplate configured to convert between a linear polarization of light and a circular polarization of light.

8. The apparatus of claim 1, wherein each unit cell further comprises:
 a lens configured to focus the received optical signals onto an associated one of the antenna elements or to expand the transmitted optical signals from the associated one of the antenna elements.

9. The apparatus of claim 1, wherein each phase modulator of each unit cell comprises one of:
 a thermal resonator having a micro-ring resonator and a heater; and
 a PN junction modulator.

10. The apparatus of claim 1, wherein the optical phased array is configured such that far-field on-axis emissions from the optical phased array overlap.

11. A method comprising:
 transmitting or receiving optical signals using a photonic integrated circuit comprising an optical phased array, the optical phased array comprising multiple unit cells, each unit cell comprising (I) multiple antenna elements that transmit or receive the optical signals, (ii) multiple signal pathways that transport the optical signals to or from the antenna elements, and (iii) multiple phase modulators that modify phases of the optical signals being transported through the signal pathways;
 wherein, in each unit cell, a first subset of the antenna elements is oriented in a first direction and a second subset of the antenna elements is oriented in a second direction opposite the first direction; and
 wherein, in each unit cell, at least some of the signal pathways have an "H" configuration.

12. The method of claim 11, wherein, in each unit cell:
 the antenna elements are arranged in rows;
 the antenna elements in one or more first rows point in the first direction; and
 the antenna elements in one or more second rows point in the second direction.

13. The method of claim 11, wherein, in each unit cell:
 the antenna elements comprise pairs of antenna elements; and
 the antenna elements of each pair are optically coupled to a common one of the signal pathways.

14. The method of claim 11, wherein, in each unit cell, path lengths to or from the antenna elements defined by the signal pathways are substantially equal to one another.

15. The method of claim 11, wherein multiple ones of the unit cells are coupled to an additional signal pathway.

16. The method of claim 11, wherein each unit cell further comprises a grating associated with each antenna element, the grating positioned above or below at least an emitting/receiving surface and one or more reflectors of the associated antenna element.

17. The method of claim 11, wherein:
 the unit cells are formed using a stack of materials; and
 the stack of materials further comprises a quarter waveplate that converts between a linear polarization of light and a circular polarization of light.

18. The method of claim 11, wherein each unit cell further comprises:
 a lens that focuses the received optical signals onto an associated one of the antenna elements or expands the transmitted optical signals from the associated one of the antenna elements.

19. The method of claim 11, wherein each phase modulator of each unit cell comprises one of:
 a thermal resonator having a micro-ring resonator and a heater; and
 a PN junction modulator.

20. An apparatus comprising:
 a photonic integrated circuit comprising an optical phased array; the optical phased array comprising multiple unit cells, each unit cell comprising:
  multiple antenna elements configured to transmit or receive optical signals, a first subset of the antenna elements oriented in a first direction, a second subset of the antenna elements oriented in a second direction opposite the first direction;

multiple signal pathways configured to transport the optical signals to or from the antenna elements, at least some of the signal pathways having an "H" configuration;

multiple phase modulators configured to modify phases of the optical signals being transported through the signal pathways; and a grating associated with each antenna element, the grating positioned above or below at least an emitting/receiving surface and one or more reflectors of the associated antenna element;

wherein, in each unit cell, the antenna elements comprise pairs of antenna elements, the antenna elements of each pair optically coupled to a common one of the signal pathways; and wherein, in each unit cell, path lengths to or from the antenna elements defined by the signal pathways are substantially equal to one another.

* * * * *